United States Patent
Pillai et al.

(10) Patent No.: US 9,253,214 B1
(45) Date of Patent: Feb. 2, 2016

(54) SYSTEMS AND METHODS FOR OPTIMIZING DATA LOSS PREVENTION SYSTEMS

(71) Applicant: Symantec Corporation, Mountain View, CA (US)

(72) Inventors: Binu Chandrasekara Pillai, Fremont, CA (US); Amit Mokal, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 1 day.

(21) Appl. No.: 14/254,874

(22) Filed: Apr. 16, 2014

(51) Int. Cl.
*H04L 29/06* (2006.01)
*G06F 21/60* (2013.01)

(52) U.S. Cl.
CPC ............. *H04L 63/20* (2013.01); *G06F 21/60* (2013.01)

(58) Field of Classification Search
CPC . G06F 21/60; G06F 2221/03; G06F 2221/07; G06F 21/556
See application file for complete search history.

(56) References Cited

U.S. PATENT DOCUMENTS

| 8,544,060 B1* | 9/2013 | Khetawat | 726/1 |
| 2010/0162347 A1* | 6/2010 | Barile | 726/1 |
| 2012/0151551 A1 | 6/2012 | Readshaw et al. | |
| 2012/0210388 A1 | 8/2012 | Kolishchak | |

OTHER PUBLICATIONS

"Websense Products", http://www.websense.com/content/websense-products.aspx, as accessed Dec. 17, 2013, Websense, Inc., (Jan. 16, 2013).
"McAfee", http://www.mcafee.com, as accessed Dec. 17, 2013, McAfee, Inc., (Feb. 29, 2000).
"RSA", http://www.emc.com/domains/rsa/index.htm, as accessed Dec. 17, 2013, EMC Corporation, (Feb. 27, 2012).
Sarin Sumit Manmohan; Systems and Methods for Detecting Data Leaks; U.S. Appl. No. 14/185,249, filed Feb. 20, 2014.

* cited by examiner

*Primary Examiner* — Izunna Okeke
(74) *Attorney, Agent, or Firm* — ALG Intellectual Property, LLC (57) ABSTRACT

The disclosed computer-implemented method for optimizing data loss prevention (DLP) systems may include (1) monitoring data distributed via at least one data-distribution channel, (2) detecting, by analyzing the distributed data, a plurality of partial violations of a set of DLP policies, (3) determining, based on a correlation between the plurality of partial violations, that the plurality of partial violations suggest a previously undetected DLP threat, and (4) formulating an adjustment to apply to the set of DLP policies to enable the set of DLP policies to detect the DLP threat in the future. Various other methods, systems, and computer-readable media are also disclosed.

18 Claims, 7 Drawing Sheets

DLP Policy Set
400

| Policy | Rules |
|---|---|
| P1 | R1, R2 |
| P2 | R3, R4, R5 |
| P3 | R6, R7 |
| P4 | R8, R9, R10, R11 |

DLP Policy Violations
402

| File | Violated Rules |
|---|---|
| F1 | R4, R10 |
| F2 | R1, R2, R5 |
| F3 | R6 |
| F4 | R3, R4, R10, R11 |
| F5 | R2, R5, R7 |
| F6 | R3, R8 |
| F7 | R2, R4, R5 |

*FIG. 4*

Adjustment
214

Rules R2 and R5 are frequently violated together. Recommend adding new policy:

P5: R2 AND R5

SYSTEMS AND METHODS FOR OPTIMIZING DATA LOSS PREVENTION SYSTEMS

BACKGROUND

Individuals and entities increasingly share, access, and disseminate high volumes of electronic information. In addition, the ubiquity of high-speed Internet access, mobile devices, and portable storage has led to an increasingly mobile workforce. As a consequence, it has become more difficult than ever for organizations to prevent sensitive information from being lost and/or compromised.

For example, users may maliciously or unintentionally leak confidential data to unauthorized third parties via a variety of communication channels. In order to prevent these security breaches, conventional data loss prevention (DLP) systems typically monitor the flow of information over data-distribution channels. For example, many traditional DLP systems analyze distributed data by searching for particular combinations of attributes that indicate DLP threats.

Unfortunately, conventional DLP systems may have a limited number and/or a predefined set of policies and therefore may only check distributed data for a limited number of attribute combinations. In addition, these DLP policies may be broad, rather than tailored to specific DLP threats within individual organizations. These deficiencies may be enhanced as organizations grow and their communication channels diversify. Similarly, the data distribution patterns of an organization may evolve over time as the communication needs of the organization change and/or as malicious users learn to evade existing DLP policies. Conventional DLP systems, however, may be static and unable to adapt to new DLP threats. As such, the current disclosure identifies and addresses a need for more efficient and effective systems and methods for optimizing DLP systems.

SUMMARY

As will be described in greater detail below, the instant disclosure describes various systems and methods for optimizing data loss prevention (DLP) systems by recommending adjustments to DLP policies in response to detecting correlations between partial DLP policy violations. In one example, a computer-implemented method for optimizing data loss prevention (DLP) systems may include (1) monitoring data distributed via at least one data-distribution channel, (2) detecting, by analyzing the distributed data, a plurality of partial violations of a set of DLP policies, (3) determining, based on a correlation between the plurality of partial violations, that the plurality of partial violations suggest a previously undetected DLP threat, and (4) formulating an adjustment to apply to the set of DLP policies to enable the set of DLP policies to detect the DLP threat in the future.

In some examples, detecting the plurality of partial violations may include detecting (1) a violation of at least one rule within a DLP policy within the set of DLP policies and (2) an additional violation of at least one rule within an additional DLP policy within the set of DLP policies. In some embodiments, detecting the plurality of partial violations may also include detecting the plurality of partial violations within a single distributed file.

In some examples, detecting the plurality of partial violations may include detecting the plurality of partial violations within each of a plurality of distributed files. In these examples, determining that the plurality of partial violations suggest the previously undetected DLP threat may include determining that a frequency with which the plurality of distributed files were distributed exceeds a predetermined frequency.

In some embodiments, detecting the plurality of partial violations may include analyzing the distributed data in real-time as the distributed data is identified. Additionally or alternatively, detecting the plurality of partial violations may include analyzing the distributed data in batches.

In some examples, formulating the adjustment to apply to the set of DLP policies may include formulating a new DLP policy to add to the set of DLP policies and/or modifying an existing DLP policy within the set of DLP policies. Additionally, in these examples, the plurality of partial violations may include violations of individual rules within at least one DLP policy. In addition, the new DLP policy may include rules designed to detect distributed data that violates each of the individual violated rules.

In some embodiments, formulating the adjustment to apply to the set of DLP policies may include automatically updating the set of DLP policies with the adjustment. In addition, in some embodiments, formulating the adjustment to apply to the set of DLP policies may include presenting, to an administrator of the set of DLP policies, the adjustment via a graphical user interface that enables the administrator to update the set of DLP policies with the adjustment.

In some examples, the method may further include updating the adjustment applied to the set of DLP policies. In these examples, updating the adjustment may include (1) determining that the adjustment results in a DLP policy that incorrectly classifies distributed data as the DLP threat and (2) updating the DLP policy by removing and/or modifying the DLP policy in response to determining that the adjustment results in the DLP policy incorrectly classifying distributed data as the DLP threat.

In one embodiment, a system for implementing the above-described method may include (1) a monitoring module that monitors data distributed via at least one data-distribution channel, (2) a detection module that detects, by analyzing the distributed data, a plurality of partial violations of a set of DLP policies, (3) a determination module that determines, based on a correlation between the plurality of partial violations, that the plurality of partial violations suggest a previously undetected DLP threat, and (4) a formulation module that formulates an adjustment to apply to the set of DLP policies to enable the set of DLP policies to detect the DLP threat in the future. In addition, the system may include at least one processor configured to execute the monitoring module, the detection module, the determination module, and the formulation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor data distributed via at least one data-distribution channel, (2) detect, by analyzing the distributed data, a plurality of partial violations of a set of DLP policies, (3) determine, based on a correlation between the plurality of partial violations, that the plurality of partial violations suggest a previously undetected DLP threat, and (4) formulate an adjustment to apply to the set of DLP policies to enable the set of DLP policies to detect the DLP threat in the future.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for optimizing data loss prevention (DLP) systems. As will be explained in greater detail below, by identifying correlations between partial DLP policy violations, the systems and methods described herein may discover previously undetected DLP threats. In addition, the disclosed systems and methods may optimize DLP systems by recommending adjustments to DLP policies that enable detection of the discovered threats. Furthermore, the disclosed systems and methods may adjust DLP systems by tailoring DLP policies to specific DLP threats within data streams of individual organizations.

Figure 1:
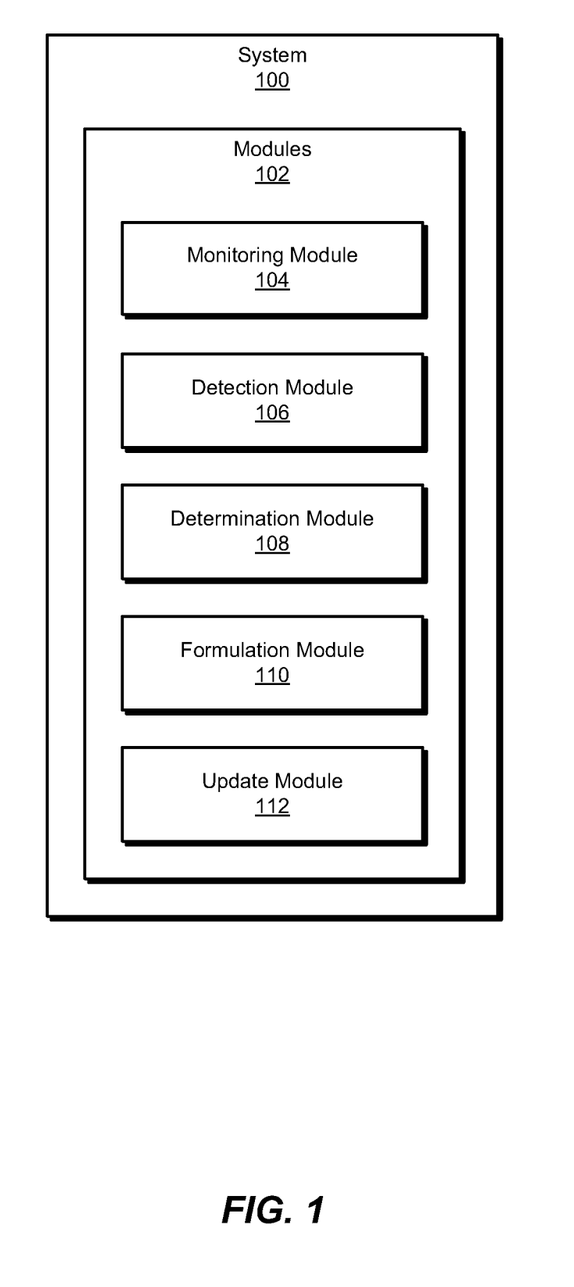
FIG. 1 is a block diagram of an exemplary system for optimizing data loss prevention (DLP) systems.
Figure 2:
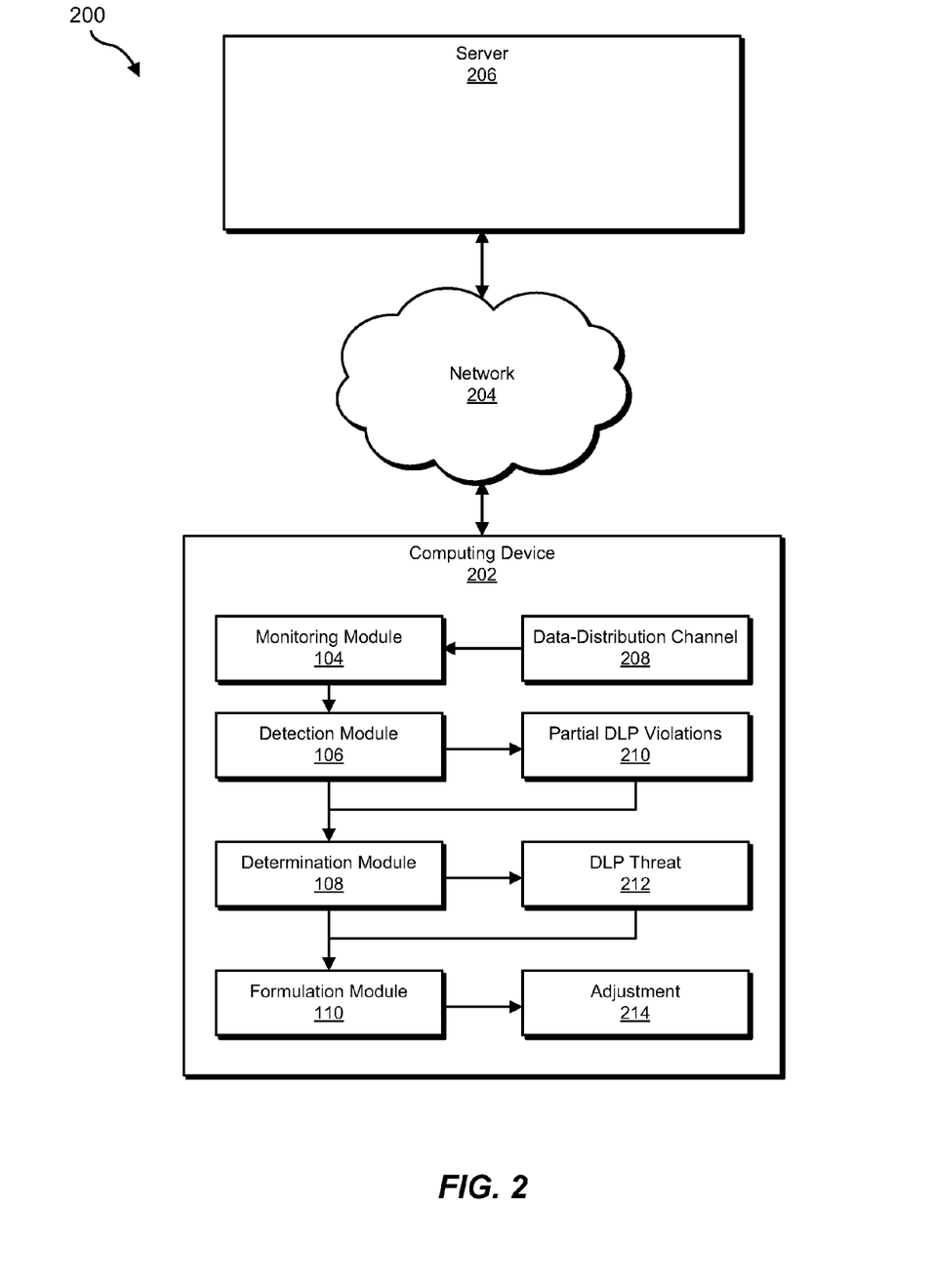
FIG. 2 is a block diagram of an additional exemplary system for optimizing data loss prevention (DLP) systems.

The following will provide, with reference to FIGS. 1-2, detailed descriptions of exemplary systems for optimizing data loss prevention (DLP) systems. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for optimizing data loss prevention (DLP) systems. As illustrated in this figure, exemplary system 100 may include one or more modules 102 for performing one or more tasks. For example, and as will be explained in greater detail below, exemplary system 100 may include a monitoring module 104 that monitors data distributed via at least one data-distribution channel. Exemplary system 100 may also include a detection module 106 that detects, by analyzing the distributed data, a plurality of partial violations of a set of DLP policies.

In addition, and as will be described in greater detail below, exemplary system 100 may include a determination module 108 that determines, based on a correlation between the plurality of partial violations, that the plurality of partial violations suggest a previously undetected DLP threat. Exemplary system 100 may also include a formulation module 110 that formulates an adjustment to apply to the set of DLP policies to enable the set of DLP policies to detect the DLP threat in the future. Furthermore, exemplary system 100 may include an update module 112 that updates the adjustment applied to the set of DLP policies. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, illustrated in FIG. 2, computing device 202 may be programmed with all of modules 102. Additionally or alternatively, server 206 may be programmed with one or all of modules 102.

In some examples, the functionality of modules 102 may be implemented across both computing device 202 and server 206 to most effectively detect and prevent DLP threats. For example, monitoring module 104 may be hosted on server 206 in order to monitor data disseminated by multiple users via server 206 and/or network 204. In addition, all or some of the remaining modules may be hosted on computing device 202, as analyzing DLP violations may be the most resource-intensive step of the DLP system optimization process.

In one embodiment, one or more of modules 102 from FIG. 1 may, when executed by at least one processor of computing device 202 and/or server 206, enable computing device 202 and/or server 206 to optimize DLP systems. For example, and as will be described in greater detail below, monitoring module 104 may cause computing device 202 and/or server 206 to monitor data distributed via at least one data-distribution channel (e.g., data-distribution channel 208). In this example, detection module 106 may cause computing device 202 and/or server 206 to detect a plurality of partial violations (e.g., partial DLP violations 210) by analyzing the distributed data. Next, determination module 108 may cause computing device 202 and/or server 206 to determine that the plurality of partial violations suggest a previously undetected DLP threat (e.g., DLP threat 212) based on a correlation between the plurality of partial violations. Finally, formulation module 110 may cause computing device 202 and/or server 206 to formulate an adjustment (e.g., adjustment 214) to apply to the set of DLP policies to enable the set of DLP policies to detect the DLP threat in the future.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of distributing, storing, and/or analyzing data related to DLP threats. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
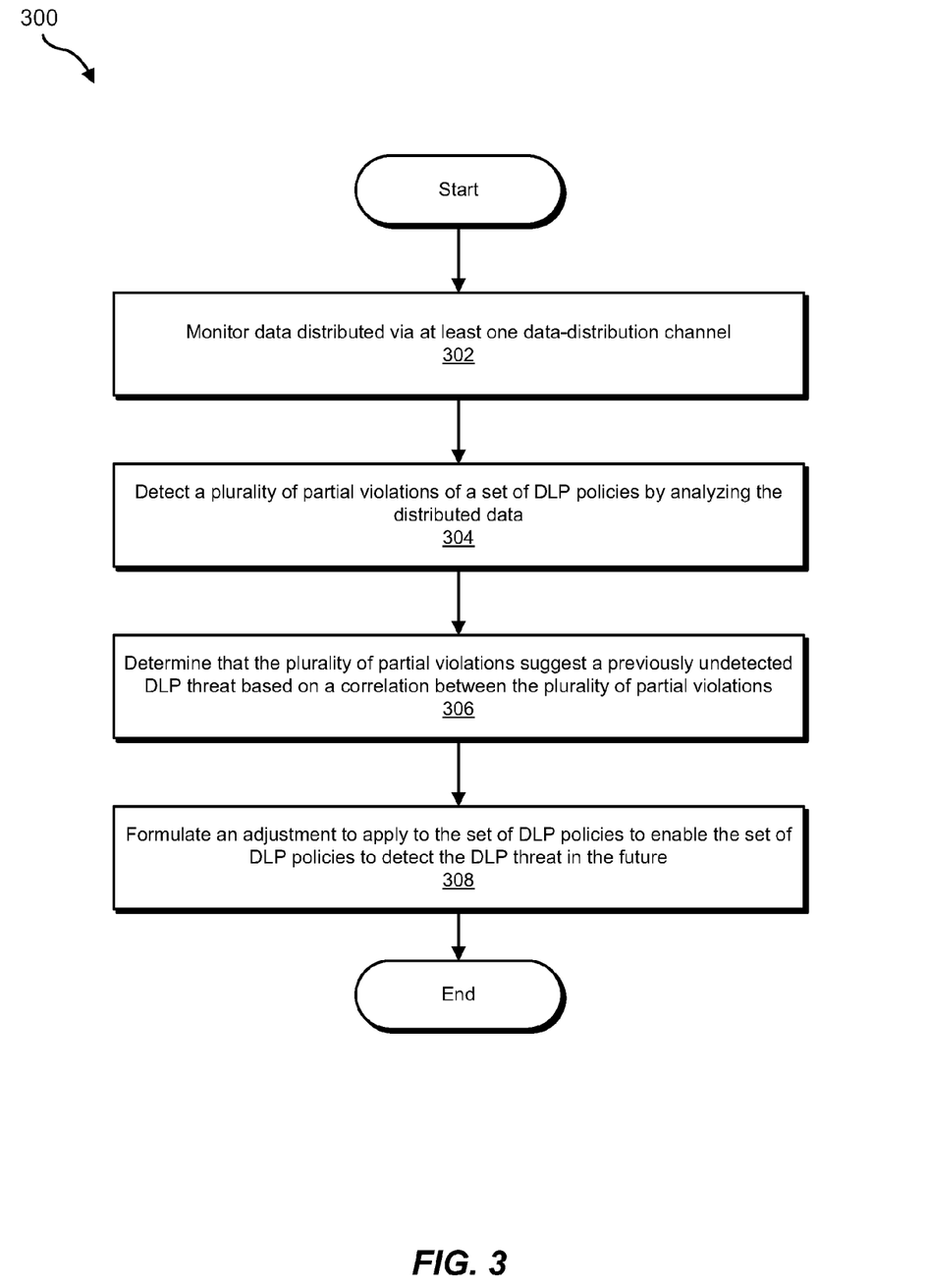
FIG. 3 is a flow diagram of an exemplary method for optimizing data loss prevention (DLP) systems.

FIG. 3 is a flow diagram of an exemplary computer-implemented method 300 for optimizing data loss prevention (DLP) systems. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor data distributed via at least one data-distribution channel. For example, monitoring module 104 may, as part of computing device 202 in FIG. 2, monitor data distributed via data-distribution channel 208.

The phrase "data-distribution channel," as used herein, generally refers to any type or form of communication pathway, computing system, and/or executable code capable of dispersing digital information from one user and/or computing device to another. Examples of data-distribution channels include, without limitation, computing devices, portable storage devices, mobile communication devices, email accounts, text-messaging services, social networking platforms, Internet and Ethernet networks, servers, and/or any other suitable communication channel.

The systems described herein may monitor the data distributed via the data-distribution channel in a variety of ways. In some examples, monitoring module 104 may identify a particular data-distribution channel or set of data-distribution channels utilized by a particular user. However, in some embodiments, monitoring module 104 may identify some or all data-distribution channels utilized by a group of users (e.g., members of an organization). For example, monitoring module 104 may identify and monitor data distributed via web accounts and/or computing devices belonging to members of an organization in order to detect multiple DLP threats within the organization.

The phrase "DLP threat," as used herein, generally refers to any type or form of distributed data that potentially compromises or harms the financial and/or personal security of an individual and/or organization. Examples of DLP threats include, without limitation, the unauthorized distribution of credit card numbers, bank statements, social security numbers, personal addresses, phone numbers, classified research, combinations of one or more of the same, and/or any additional sensitive information. In some examples, users may maliciously or unintentionally distribute data containing DLP threats to unauthorized parties. In addition, in some embodiments, attackers may intercept or otherwise obtain access to data representing DLP threats.

Once monitoring module 104 has identified data-distribution channel 208, monitoring module 104 may monitor data-distribution channel 208 in a variety of ways. For example, if data-distribution channel 208 is a web account, monitoring module 104 may monitor data-distribution channel 208 by identifying distributed messages and/or attachments within distributed messages. If data-distribution channel 208 is a computing device, monitoring module 104 may monitor files downloaded to and/or uploaded from the computing device. Monitoring module 104 may also monitor files transferred to and from the computing device. In general, monitoring module 104 may monitor any type of data-distribution channel by identifying data distributed via the channel.

In some examples, monitoring module 104 may associate data-distribution channel 208 with a particular user. For example, monitoring module 104 may associate a user with a computing device and/or messaging account by identifying login credentials that the user enters to access the computing device and/or messaging account. Associating data-distribution channel 208 with a particular user may later allow the disclosed systems to take action against a particular user that is distributing sensitive data. However, in some embodiments, monitoring module 104 may not associate data-distribution channel 208 with a particular user. For example, monitoring module 104 may simply identify and/or store distributed data without consuming computing resources to identify the origin of the distributed data. As will be explained in greater detail below, the systems and methods described herein may effectively detect DLP threats without identifying the malicious user or attacker responsible for the DLP threats.

Returning to FIG. 3, at step 304 one or more of the systems described herein may detect, by analyzing the distributed data, a plurality of partial violations of a set of DLP policies. For example, detection module 106 may, as part of computing device 202 in FIG. 2, detect partial DLP violations 210 by analyzing the data distributed via data-distribution channel 208.

The systems described herein may analyze the distributed data in a variety of ways. In some examples, detection module 106 may analyze the distributed data using one or more DLP analysis technologies, such as Described Content Matching (DCM), Indexed Data Matching (IDM), Exact Data Matching (EDM), and/or Vector Machine Learning (VML). In addition, in some embodiments, detection module 106 may analyze the distributed data in real-time as monitoring module 104 identifies the distributed data. In this way, detection module 106 may immediately detect DLP threats and may therefore enable the disclosed systems to rapidly formulate adjustments to DLP policies. In other examples, detection module 106 may analyze the distributed data in batches (by, e.g., storing the distributed data in a database and analyzing large sections of distributed data at a time). In this way, detection module 106 may identify and correlate greater numbers of DLP policy violations and/or may more efficiently distribute computing resources between monitoring and analyzing tasks.

In some embodiments, detection module 106 may identify partial DLP violations 210 by searching for particular attributes and/or types of information within the distributed data. For example, detection module 106 may search for strings of numbers associated with sensitive and/or private data (e.g., social security numbers, credit card numbers, bank accounts, etc.). Additionally or alternatively, detection module 106 may search for keywords that indicate sensitive and/or private data (e.g., documents labeled "confidential", files containing names of classified projects and/or client names, etc.). In general, detection module 106 may search for any attribute, or combination of attributes, that indicates a piece of distributed data may represent a DLP threat.

Once detection module 106 has analyzed the distributed data, detection module 106 may determine whether the data represents a DLP policy violation based on the analysis. For example, detection module 106 may compare the results of the analysis to a set of DLP policies. The DLP policies may impose any set of restrictions on data distribution, such as limiting the amount and/or the content of distributed data. In addition, the DLP policies may take into consideration the position (e.g., security clearance or role within an organization) of the distributor and/or the receiver of the data, as well as any additional attribute of the distributed data, such as the location from which the data was distributed and/or the time at which the data was distributed. The DLP policies may be any set of DLP policies already implemented within an organization and/or they may be customized and tailored to embodiments of the present disclosure.

Figure 4:
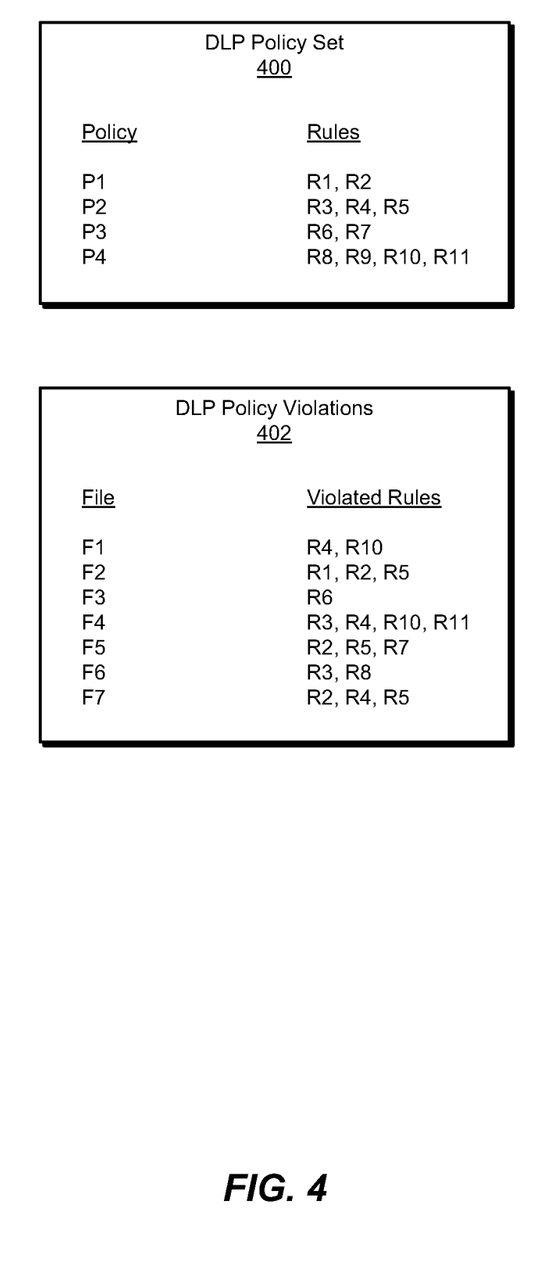
FIG. 4 is an illustration of exemplary DLP policies and DLP policy violations.

In some embodiments, detection module 106 may determine whether the distributed data partially or fully violates a DLP policy. For example, a DLP policy may contain sets of criteria (or "rules"), of which one or more must be violated in order to fully violate the DLP policy. As an example, FIG. 4 illustrates a set of DLP policies. As shown in FIG. 4, DLP policy set 400 may contain four DLP policies (in this example, "P1", "P2", "P3", and "P4"). In addition, each DLP policy may contain multiple rules (in this example, "R1"-"R11"). Each of rules R1-R11 may contain a specific attribute (or combination of attributes) that, if present within a portion of distributed data, indicate the portion of distributed data violates the rule. As an example, R1 may correspond to a credit card number. In addition, R2 may correspond to a bank account number.

In some examples, a DLP policy may define a logical connection between the rules within the DLP policy to indicate the particular combination of rules that must be violated in order to fully violate the policy. For example, policy P1 may state that both rules R1 and R2 must be violated in order to fully violate P1 (e.g., R1 and R2 are connected with a Boolean "AND" operator). Additionally, policy P1 may state that either rule R1 or rule R2 may be violated in order to fully violate P1 (e.g., R1 and R2 are connected with a Boolean "OR" operator). In general, each rule within policies P1-P4 may contain any attribute (or combination of attributes). Furthermore, each of policies P1-P4 may be fully violated when all (or a particular combination) of rules are violated according to any set of logical rules.

If a DLP policy contains multiple rules, detection module 106 may determine that the distributed data partially violates the DLP policy by determining that the distributed data violates one or more rules within the DLP policy, but does not violate enough rules within the DLP policy to trigger a full violation. Referring to the example of FIG. 4, if policy P1 is defined by R1 AND R2, detection module 106 may determine that the distributed data partially violates policy P1 if the distributed data violates either rule R1 or rule R2, but does not violate both rule R1 and rule R2. Specifically, detection module 106 may determine that the distributed data partially violates policy P1 if the distributed data contains either a credit card number or a bank account number. In the case that the distributed data violates both rule R1 and rule R2 (e.g., the distributed data contains both a credit card number and a bank account number), detection module 106 may determine that the distributed data represents a full DLP policy violation and may therefore implement mitigation action appropriate for handling a full DLP policy violation (e.g., recording the full DLP policy violation, censuring a user that committed the full DLP policy violation, etc.). In this case, detection module 106 may not record any partial DLP violations.

In some embodiments, detection module 106 may use the analyses described above to identify and record any and/or all instances of partial DLP violations (e.g., instances of a single violated rule and/or instances of multiple violated rules). As part of identifying any and/or all partial DLP violations, detection module 106 may identify partial DLP violations 210. As will be explained in greater detail below, partial DLP violations 210 may represent any combination of rules that were violated within the same portion of distributed data and/or related portions of distributed data.

In some examples, detection module 106 may detect partial DLP violations 210 by detecting a violation of at least one rule within a DLP policy within the set of DLP policies and an additional violation of at least one rule within an additional DLP policy within the set of DLP policies. In other words, partial DLP violations 210 may represent violations of at least one rule within two different policies. As an example, determination module 108 may detect partial DLP violations 210 by detecting a violation of rule R1 (within policy P1) and rule R8 (within policy P4) in FIG. 4. Additionally or alternatively, detection module 106 may detect partial DLP violations 210 by detecting a violation of multiple rules within a single DLP policy. For example, determination module 108 may detect a violation of rule R8 and rule R9 within policy P4 in FIG. 4. In general, detection module 106 may detect partial DLP violations 210 by determining that the distributed data violates at least two separate rules within one or more DLP policies.

In some embodiments, detection module 106 may detect partial DLP violations 210 within a single distributed file. For example, detection module 106 may determine that a single file (e.g., a single email or individual document) contains each of partial DLP violations 210 (e.g., violates each of rules R1 and R8, as in the example above). However, in other examples, a malicious user may distribute sensitive information via multiple files. In these examples, if monitoring module 104 associates the distributed data with a user responsible for distributing the data, detection module 106 may detect partial DLP violations 210 within a plurality of files distributed by a single user. For example, detection module 106 may determine that a particular user sent an email that violates rule R1 and later that the same user sent an email that violates rule R8. Furthermore, detection module 106 may only record violations within multiple files as partial DLP violations 210 if the multiple files were distributed within a predetermined amount of time (e.g., half an hour).

In some examples, detection module 106 may detect partial DLP violations 210 within each of a plurality of distributed files. For example, partial DLP violations 210 may represent a particular combination of violated rules. In this example, detection module 106 may detect the same combination of violated rules within multiple distributed files. In some embodiments, the plurality of files may have been distributed by a single user. Additionally or alternatively, the plurality of files may have been distributed by multiple users. Furthermore, the plurality of files may have been distributed over any period of time. While detection module 106 may only require one instance of detecting partial DLP violations 210 to determine a DLP threat, detecting multiple instances of partial DLP violations 210 may increase the probability that partial DLP violations 210 represent a DLP threat, as will be explained in greater detail below.

Returning to FIG. 3, at step 306 one or more of the systems described herein may determine that the plurality of partial violations suggest a previously undetected DLP threat based on a correlation between the plurality of partial violations. For example, determination module 108 may, as part of computing device 202 in FIG. 2, determine that partial DLP violations 210 suggest DLP threat 212 based on a correlation between partial DLP violations 210.

The systems described herein may determine that a correlation between the plurality of partial violations suggests a previously undetected DLP threat in a variety of ways. In some examples, determination module 108 may identify the correlation between partial DLP violations 210 by identifying multiple instances of partial DLP violations 210. For example, detection module 106 may detect partial DLP violations 210 within each of a plurality of distributed files and store each instance of DLP violations 210 within a database. Next, determination module 108 may analyze the information stored in the database to identify the multiple instances of partial DLP violations 210. Determination module 108 may then determine that a correlation exists between the individual rules represented within partial DLP violations 210 based on the multiple re-occurrences of partial DLP violations 210.

Determination module 108 may identify the multiple instances of partial DLP violations 210 using any suitable method. In some examples, determination module 108 may employ frequent itemset mining techniques, such as Apriori algorithms, Eclat algorithms, Split and Merge (SaM) algorithms, Recursive Elimination (RElim) algorithms, combinations of one or more of the same, and/or any other frequent itemset mining algorithm. In general, frequent itemset mining may identify combinations of items that occur together most frequently within a set of transactions. For example, as explained in an embodiment of the "market basket" problem, frequent itemset mining techniques may determine that customers tend to purchase certain items (e.g., bread and milk) together more often than they purchase other combinations of items (e.g., bread and soda). Notably, frequent itemset techniques may not imply a causation between items (e.g., if a customer buys bread they are more likely to also by milk); rather, they simply point out an increased occurrence of two or more items represented in the same transaction.

As applied to detecting DLP threat 212, determination module 108 may use frequent itemset mining techniques to determine that partial DLP violations 210 occur more frequently than some and/or all other combinations of partial DLP violations. As an example, FIG. 4 illustrates an exemplary set of DLP policy violations. DLP policy violations 402 may represent each partial violation detected by detection module 106. As shown in FIG. 4, DLP policy violations 402 may include violations identified within seven files (in this example, files "F1"-"F7"). In addition, DLP policy violations 402 may include specific combinations of rules within rules R1-R11 that detection module 106 identified within each of files F1-F7.

After identifying each of DLP policy violations 402, determination module 108 may apply one or more frequent itemset mining techniques and/or additional analyses to DLP policy violations 402. As a result of this analysis, determination module 108 may determine that the combination of rules R2 and R5 is a frequently violated combination. As shown in FIG. 4, three files (i.e., F2, F5, and F7) include violations of rules R2 and R5 (in addition to other rule violations). Determination module 108 may determine that rules R2 and R5 occur frequently together based on rules R2 and R5 occurring together more frequently than any other combination of rules. In general, determination module 108 may identify a frequently violated combination of rules based on the combination of rules occurring a greater number of times and/or with a greater frequency than at least some other combinations of rules.

Once determination module 108 determines that a combination of rules represents a frequently violated combination of rules, determination module 108 may determine whether the combination of rules suggests a previously undetected DLP threat. For example, determination module 108 may determine that partial DLP violations 210 suggest the previously undetected DLP threat based on determining that a frequency with which the plurality of files representing each of partial DLP violations 210 were distributed exceeds a predetermined frequency. In some examples, the predetermined frequency may be a static frequency (e.g., five violations per week). In addition, in some embodiments, the predetermined frequency may not impose a temporal limitation (i.e., the frequency is simply a threshold of all detected instances).

Additionally or alternatively, the predetermined frequency may be based on the frequency with which other combinations of violated rules are detected. For example, determination module 108 may identify multiple combinations of rule violations that occur a plurality of times. In this example, determination module 108 may determine that partial DLP violations 210 suggest DLP threat 212 by determining that the frequency with which the plurality of files representing each of partial DLP violations 210 were distributed exceeds the frequency with which other files representing other combinations of violated rules were distributed. For example, determination module 108 may determine that partial DLP violations 210 were committed more frequently than a certain number and/or percentage of other combinations of violated rules.

As shown by the previous discussion, determination module 108 may determine that partial DLP violations 210 suggest DLP threat 212 simply by determining that partial DLP violations 210 occur with a frequency greater than a certain threshold. In other words, while determination module 108 may analyze the content of data that resulted in DLP violations 210 to determine that the data actually does contain sensitive information that should not be distributed, determination module 108 may not need to perform such an analysis. Instead, determination module 108 may infer, based on the repeated occurrence of partial DLP violations 210, that partial DLP violations 210 represent DLP threat 212.

Returning to FIG. 3, at step 308 one or more of the systems herein may formulate an adjustment to apply to the set of DLP policies to enable the set of DLP policies to detect the DLP threat in the future. For example, formulation module 110 may, as part of computing device 202 in FIG. 2, formulate adjustment 214 to enable the set of DLP policies to detect DLP threat 212 in the future.

The systems described herein may formulate the adjustment to apply to the set of DLP policies in a variety of ways.

In some examples, formulation module 110 may formulate a new DLP policy to add to the set of DLP policies. Specifically, if partial DLP violations 210 contain violations of individual rules within at least one DLP policy, formulation module 110 may formulate the new DLP policy to include rules designed to detect distributed data that violates each of the individual rules. Referring to the example of FIG. 4, if determination module 108 determined that partial DLP violations 210 include rules R2 and R5, formulation module 110 may define the new DLP policy as R2 AND R5. As such, formulation module 110 may enable the set of DLP policies to mitigate the previously undetected DLP threat posed by the violation of rules R2 and R5.

Additionally or alternatively, formulation module 110 may formulate adjustment 214 by modifying an existing DLP policy within the set of DLP policies. For example, if partial DLP violations 210 contain multiple rules within a single DLP policy, formulation module 110 may adjust the DLP policy by removing rules within the DLP policy that are not included within partial DLP violations 210. Referring to the example of FIG. 4, if partial DLP violations include rules R3 and R4 (but not R5), formulation module 110 may modify policy P2 to only include rules R3 and R4, as those two rules alone may be sufficient to indicate a DLP threat. In general, formulation module 110 may add, modify, and/or delete DLP policies in any suitable way to most effectively enable the set of DLP policies to detect DLP threat 212 in the future.

Figure 5:
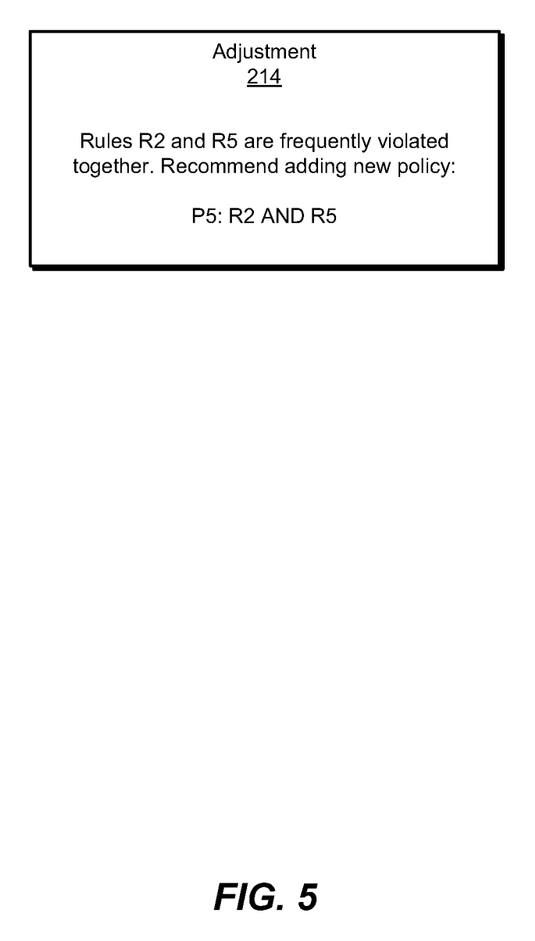
FIG. 5 is an illustration of an exemplary adjustment to a set of DLP policies.

Furthermore, formulation module 110 may apply adjustment 214 to the set of DLP policies in a variety of ways. In some examples, formulation module 110 may automatically update the set of DLP policies with adjustment 214. For example, formulation module 110 may create adjustment 214 and apply adjustment 214 to the set of DLP policies without requiring user input or interaction. However, in some embodiments, formulation module 110 may present adjustment 214 to an administrator of the set of DLP policies before applying adjustment 214 to the set of DLP policies. For example, formulation module 110 may present adjustment 214 to the administrator via a graphical user interface that enables the administrator to update the set of DLP policies with adjustment 214 (e.g., by clicking a button or checking a box within the graphical user interface). As an example, FIG. 5 shows an exemplary adjustment 214 presented to an administrator via a graphical user interface. As shown in FIG. 5, adjustment 214 may consist of a new DLP policy (P5) that is defined by R2 AND R5. In this example, formulation module 110 may allow the administrator to decide whether R2 AND R5 represents an improvement to the set of DLP policies before incorporating policy P5 into the set of DLP policies.

In addition to adjusting the set of DLP policies, update module 112 may dynamically update the applied adjustments in order to most accurately detect DLP threats. For example, update module 112 may determine that adjustment 214 applied to the set of DLP policies results in a DLP policy that incorrectly classifies distributed data as DLP threat 212. Such inaccurate policies may be defined as "false positives." Update module 112 may identify false positives in a variety of ways. For example, update module 112 may analyze the distributed data that results in a violation of the newly updated DLP policy and may determine that the content of the distributed data does not contain any sensitive information that should not be distributed. In addition, update module 112 may identify a false positive by receiving input from an administrator of the set of DLP policies that indicates that the newly updated DLP policy is incorrect and/or unnecessary.

In some examples, update module 112 may update the adjusted DLP policy in response to determining that the adjusted DLP policy incorrectly classifies distributed data as DLP threat 212. For example, update module 112 may update the adjusted DLP policy by modifying the policy, such as by adding or removing one or more rules within the policy. In addition, update module 112 may remove the adjusted DLP policy from the set of DLP policies. Update module 112 may update the adjusted DLP policy in any suitable way such that the set of DLP policies does not misidentify distributed data as a DLP threat.

The systems and methods disclosed herein may be implemented in a variety of ways and provide a number of advantages. For example, by detecting correlations between partial DLP violations, the disclosed systems and methods may identify previously unknown and potentially harmful DLP threats. In addition, the systems and methods described herein may automatically formulate adjustments that enable detection of discovered DLP threats without requiring manual analysis of distributed data. Furthermore, by detecting partial DLP violations within data streams of individual organizations, the disclosed systems and methods may dynamically improve DLP systems as the DLP threats within the organizations expand and evolve.

Figure 6:
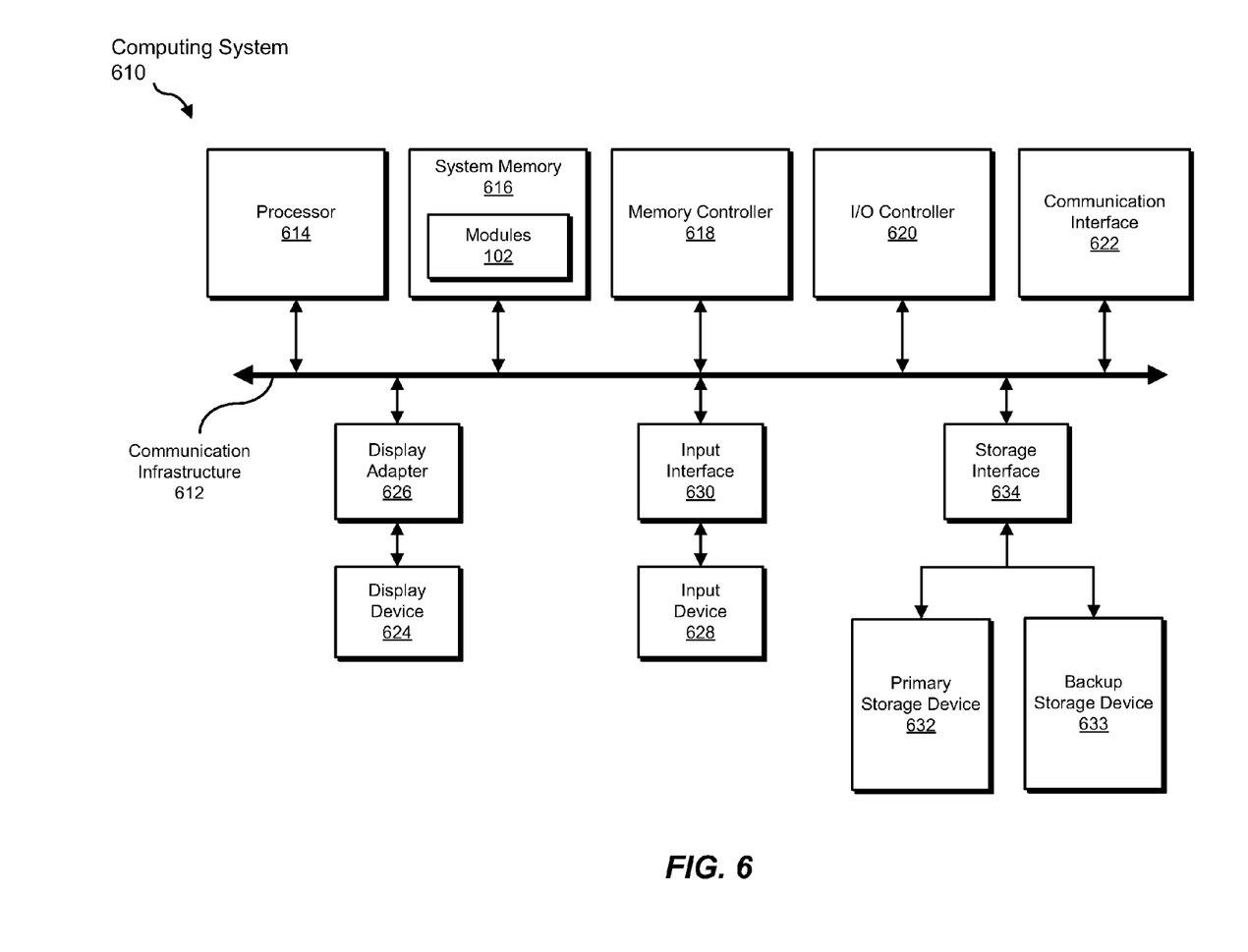
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
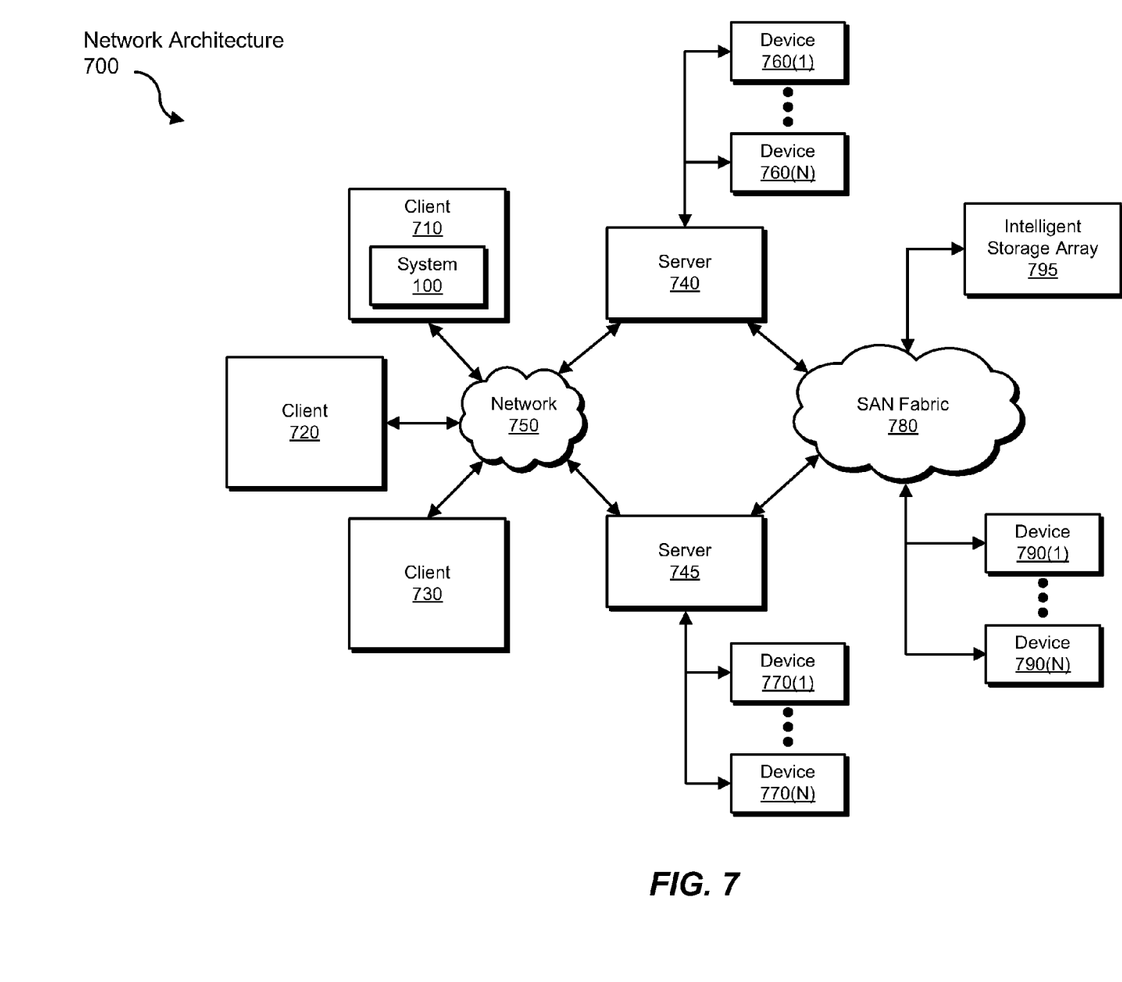
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for optimizing data loss prevention (DLP) systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive distributed data to be transformed, store the result of the transformation for analysis, transform the distributed data into partial DLP policy violations, and use the result of the transformation to formulate adjustments to DLP policies. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for optimizing data loss prevention (DLP) systems, at least a portion of the method being performed by a computing device comprising at least one processor, the method comprising:

monitoring data distributed via at least one data-distribution channel to detect distributed files that contain at least one partial violation of a DLP policy within a set of DLP policies, wherein the partial violation comprises a violation of only a portion of the DLP policy that does not trigger a full violation of the DLP policy;

detecting, by analyzing the distributed data, a plurality of distributed files that each contain the same combination of partial violations of DLP policies within the set of DLP policies;

determining, based at least in part on detecting the plurality of distributed files that each contain the same combination of partial violations, that the combination of partial violations suggests a previously undetected DLP threat based on a determination that the number of distributed files that each contain the same combination of partial violations is greater than a number of distributed files that each contain an additional combination of partial violations;

formulating an adjustment to apply to the set of DLP policies to enable the set of DLP policies to detect the DLP threat in the future.

2. The method of claim 1, wherein the combination of partial violations comprises:
   a violation of at least one rule within a DLP policy within the set of DLP policies;
   an additional violation of at least one rule within an additional DLP policy within the set of DLP policies.

3. The method of claim 1, wherein determining that the combination of partial violations suggests the previously undetected DLP threat comprises determining that a frequency with which the plurality of distributed files that each contain the same combination of partial violations were distributed exceeds a predetermined frequency.

4. The method of claim 1, wherein detecting the plurality of distributed files that each contain the same combination of partial violations comprises at least one of:
   analyzing the distributed data in real-time as the distributed data is identified;
   analyzing the distributed data in batches.

5. The method of claim 1, wherein formulating the adjustment to apply to the set of DLP policies comprises at least one of:
   formulating a new DLP policy to add to the set of DLP policies;
   modifying an existing DLP policy within the set of DLP policies.

6. The method of claim 5, wherein:
   the combination of partial violations comprises violations of individual rules within at least one DLP policy;
   the new DLP policy comprises rules designed to detect distributed data that violates each of the individual violated rules.

7. The method of claim 1, wherein formulating the adjustment to apply to the set of DLP policies comprises at least one of:
   automatically updating the set of DLP policies with the adjustment;
   presenting, to an administrator of the set of DLP policies, the adjustment via a graphical user interface that enables the administrator to update the set of DLP policies with the adjustment.

8. The method of claim 1, further comprising updating the adjustment applied to the set of DLP policies by:
   determining that the adjustment results in a DLP policy that incorrectly classifies distributed data as the DLP threat;
   in response to determining that the adjustment results in the DLP policy incorrectly classifying distributed data as the DLP threat, updating the DLP policy by at least one of:
      removing the DLP policy;
      modifying the DLP policy.

9. A system for optimizing data loss prevention (DLP) systems, the system comprising:
   a monitoring module, stored in memory, that monitors data distributed via at least one data-distribution channel to detect distributed files that contain at least one partial violation of a DLP policy within a set of DLP policies, wherein the partial violation comprises a violation of only a portion of the DLP policy that does not trigger a full violation of the DLP policy;
   a detection module, stored in memory, that detects, by analyzing the distributed data, a plurality of distributed files that each contain the same combination of partial violations of DLP policies within the set of DLP policies;
   a determination module, stored in memory, that determines, based at least in part on detecting the plurality of distributed files that each contain the same combination of partial violations, that the combination of partial violations suggests a previously undetected DLP threat based on a determination that the number of distributed files that each contain the same combination of partial violations is greater than a number of distributed files that each contain an additional combination of partial violations;
   a formulation module, stored in memory, that formulates an adjustment to apply to the set of DLP policies to enable the set of DLP policies to detect the DLP threat in the future;
   at least one processor configured to execute the monitoring module, the detection module, the determination module, and the formulation module.

10. The system of claim 9, wherein the combination of partial violations comprises:
    a violation of at least one rule within a DLP policy within the set of DLP policies;
    an additional violation of at least one rule within an additional DLP policy within the set of DLP policies.

11. The system of claim 9, wherein the determination module determines that the combination of partial violations suggests the previously undetected DLP threat by determining that a frequency with which the plurality of distributed files that each contain the same combination of partial violations were distributed exceeds a predetermined frequency.

12. The system of claim 9, wherein the detection module detects the plurality of distributed files that each contain the same combination of partial violations by at least one of:
    analyzing the distributed data in real-time as the distributed data is identified;
    analyzing the distributed data in batches.

13. The system of claim 9, wherein the formulation module formulates the adjustment to apply to the set of DLP policies by at least one of:
    formulating a new DLP policy to add to the set of DLP policies;
    modifying an existing DLP policy within the set of DLP policies.

14. The system of claim 13, wherein:
    the combination of partial violations comprises violations of individual rules within at least one DLP policy;

the new DLP policy comprises rules designed to detect distributed data that violates each of the individual violated rules.

15. The system of claim 9, wherein the formulation module formulates the adjustment to apply to the set of DLP policies by at least one of:
- automatically updating the set of DLP policies with the adjustment;
- presenting, to an administrator of the set of DLP policies, the adjustment via a graphical user interface that enables the administrator to update the set of DLP policies with the adjustment.

16. The system of claim 9, further comprising an update module that updates the adjustment applied to the set of DLP policies by:
- determining that the adjustment results in a DLP policy that incorrectly classifies distributed data as the DLP threat;
- in response to determining that the adjustment results in the DLP policy incorrectly classifying distributed data as the DLP threat, updating the DLP policy by at least one of:
  - removing the DLP policy;
  - modifying the DLP policy.

17. A non-transitory computer-readable medium comprising one or more computer-executable instructions that, when executed by at least one processor of a computing device, cause the computing device to:
- monitor data distributed via at least one data-distribution channel to detect distributed files that contain at least one partial violation of a data loss prevention (DLP) policy within a set of DLP policies, wherein the partial violation comprises a violation of only a portion of the DLP policy that does not trigger a full violation of the DLP policy;
- detect, by analyzing the distributed data, a plurality of distributed files that each contain the same combination of partial violations of DLP policies within the set of DLP policies;
- determine, based at least in part on detecting the plurality of distributed files that each contain the same combination of partial violations, that the combination of partial violations suggests a previously undetected DLP threat based on a determination that the number of distributed files that each contain the same combination of partial violations is greater than a number of distributed files that each contain an additional combination of partial violations;
- formulate an adjustment to apply to the set of DLP policies to enable the set of DLP policies to detect the DLP threat in the future.

18. The computer-readable medium of claim 17, wherein the combination of partial violations comprises:
- a violation of at least one rule within a DLP policy within the set of DLP policies;
- an additional violation of at least one rule within an additional DLP policy within the set of DLP policies.

* * * * *